United States Patent Office 3,322,136
Patented May 30, 1967

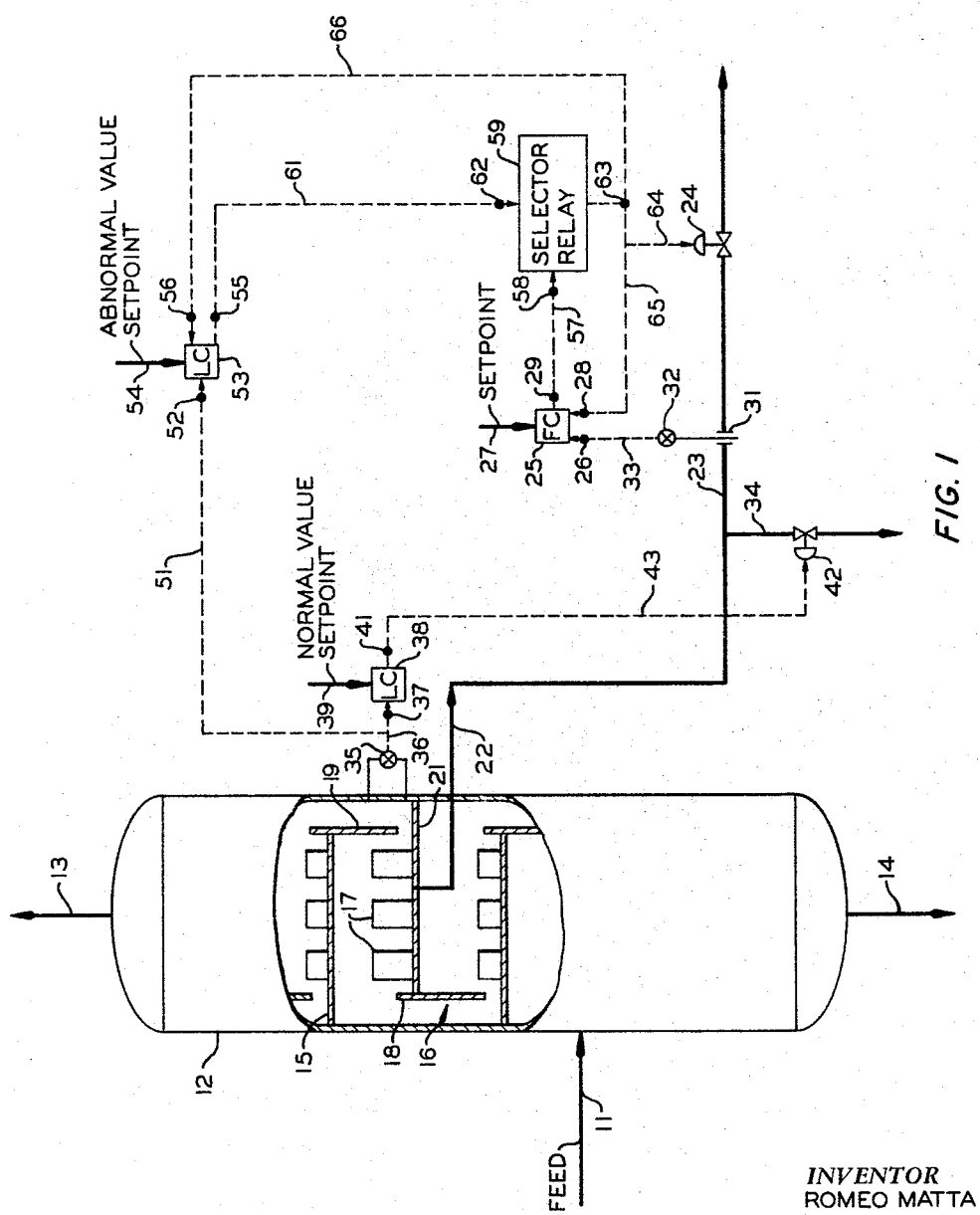

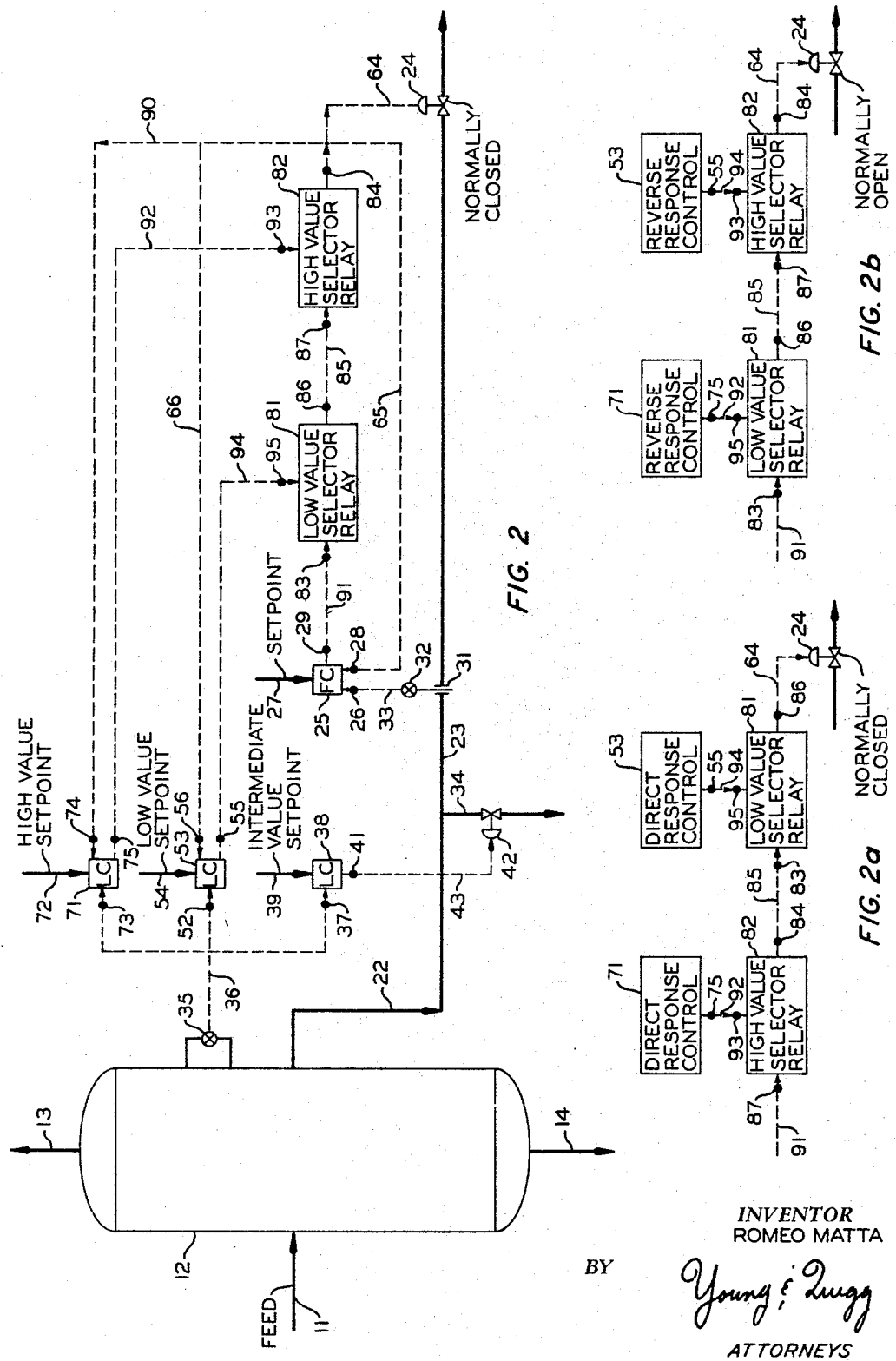

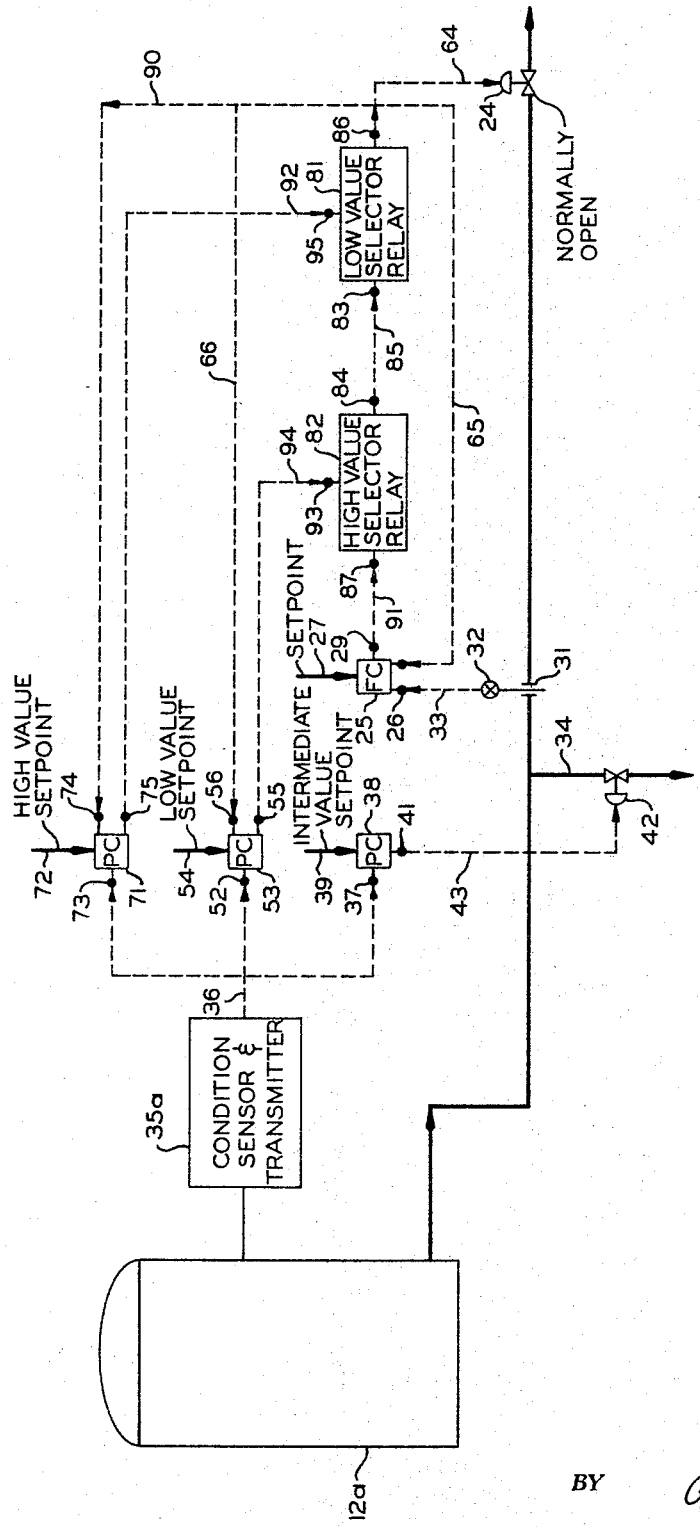

3,322,136
FLUID TRANSFER CONTROL SYSTEM
Romeo Matta, Bartlesville, Okla., assignor to Phillips Petroleum Company, a corporation of Delaware
Filed Dec. 30, 1964, Ser. No. 422,258
12 Claims. (Cl. 137—118)

This invention relates to method and apparatus for the control of a fluid transfer system.

There are situations where a fluid stream is withdrawn from a column to serve as a source of a constant flow rate stream of the fluid. For example a liquid stream can be withdrawn from a sidedraw tray in a fractionation column to serve as the source of a constant flow rate of the particular liquid. However it is also necessary to maintain a certain degree of control of the liquid level on the sidedraw tray for proper column operation. Where a suction pump is used on the withdrawal line, it is also necessary to maintain a liquid level on the sidedraw tray to prevent loss of suction which could damage the pump. Accordingly it has become desirable to find a control system which will accomplish these purposes.

In accordance with the invention two streams of fluid are withdrawn with one stream being controlled responsive to the variation of a characteristic of the fluid, such as liquid level, from a normal value, and the other stream is controlled to provide a constant flow rate stream except in those instances where the characteristic reaches an abnormal value, such as the liquid level falling below a certain low value. In the latter instances the control of the second stream is effected responsive to the variation of the characteristic outside the normal range established by said abnormal value.

Accordingly it is an object of the invention to provide a stream of fluid at a constant flow rate while maintaining a characteristic of the source of the stream within predetermined limits. An object of the invention is to provide a control system for maintaining a constant flow rate of a fluid stream under normal conditions and to vary the stream flow rate under abnormal conditions to return the conditions to normal. It is an object of the invention to withdraw a constant flow rate liquid stream from a source while maintaining the liquid level in said source substantially constant.

Other aspects, objects and advantages of the invention will be apparent from a study of the disclosure, the drawings and the appended claims.

In the drawings FIGURE 1 is a schematic representation of a fluid transfer system utilizing a control system in accordance with one embodiment of the invention; FIGURE 2 is a schematic representation of a fluid transfer control system in accordance with another embodiment of the invention; FIGURES 2a and 2b are minor modifications of the embodiment of FIGURE 2; and FIGURE 3 is a schematic representation of a fluid transfer control system in accordance with a further embodiment of the invention.

Referring now to the drawings and to FIGURE 1 in particular, a feed-stream to be fractionated is passed through line 11 into fractional distillation column 12. An overhead product is withdrawn from column 12 by way of conduit 13 while the kettle product is removed by way of conduit 14. Column 12 can be provided with any conventional liquid-vapor contact trays, for example bubble cap trays 15. Column 12 also contains a sidestream product take off tray 16 containing one or more chimneys 17 and a baffle plate or weir 18. A plate 19 is provided to define a downcomer space between that plate and the wall of column 12 for downward passage of liquid from the bubble cap tray 15 above take off tray 16. The lower end of baffle plate 19 is near deck plate 21 of tray 16 so as to provide a vapor trap. The lower end of baffle plate 18 extends downwardly to a point adjacent the deck plate of the next lower tray to provide a vapor seal. A pipe 22 leads from the level of the top surface of deck plate 21 downwardly and through the wall of column 12 for the withdrawal of the liquid sidestream product. A first conduit means 23 communicates with pipe 22 for the withdrawal of a first stream of fluid therefrom and the passage of this first stream to a point of utilization. Due to some characteristic or preferred mode of operation at this point of utilization, it is desirable that this first stream be provided at a substantially constant flow rate for as much time as is possible. In order to provide for the desired constant flow rate of the first stream, a first valve means 24 is operatively positioned in first conduit means 23 and is regulated by the output of a flow controller 25. The flow controller 25 can be any conventional flow controller, but preferably is one having a flow measurement signal input 26, a setpoint signal input 27, an antireset-windup feedback input 28, and an output 29. A flow sensing means, which can be any conventional flow sensing device, for example orifice 31 and flow transmitter 32, a turbine flowmeter, a mass flowmeter, etc., is operatively associated with first conduit means 23 for the purpose of producing an output signal which is representative of the flow rate of the first stream of fluid through the first conduit means 23. A line 33 is provided to connect the output signal of flow transmitter 32 to the flow measurement signal input 26 of flow controller 25.

A second conduit means 34 is also provided in fluid communication with pipe 22 for the withdrawal of a second stream of fluid therefrom and the passage of the second stream to a point of storage, utilization, disposal or recycle. In order to provide for the proper operation of column 12 it is desirable to maintain the liquid level on tray 16 within certain predetermined limits. A liquid level sensor and transmitter 35 is positioned in fluid communication with the region of column 12 immediately above deck plate 21 to establish an output signal representative of the level of the liquid on tray 16. Line 36 connects the output of transmitter 35 to the measurement signal input 37 of a liquid level controller 38. Controller 38 is also provided with a setpoint input 39 and an output 41. The setpoint 39 of controller 38 is adjusted to correspond to the value of liquid level on tray 16 which it is desired to maintain under normal conditions. A valve means 42 is operatively positioned in conduit means 34 to provide for the regulation of the rate of flow of the second stream of fluid therethrough. Line 43 connects the output 41 of controller 38 to valve 42 to actuate valve 42 responsive to the output of controller 38, that is, the difference in the value of the normally desired liquid level as represented by setpoint 39 and the actual liquid level as indicated by the output of transmitter 35.

Thus under usual operating conditions valve 24 is regulated by flow controller 25 to provide a constant flow rate of the first stream of fluid through conduit means 23 and valve 42 is regulated by controller 38 to maintain the desired liquid level on tray 16. However a change in conditions in column 12 can occur which results in the production of an amount of liquid on tray 16 which is insufficient to provide the desired constant flow rate through conduit 23. As the liquid level falls below the normally desired level, controller 38 will progressively close valve 42 to decrease the amount of fluid passed through conduit means 34. In large upsets the liquid level of tray 16 can fall to the point where controller 38 completely shuts valve 42, but the amount of liquid on tray 16 is still insufficient to provide the desired constant flow of fluid through conduit means 23. Such an event would result in draining tray 16 to the point where the vapor seal in the next higher tray is lost, thus causing a severe upset in the column. In accordance with an objective of the present invention to prevent such a loss of vapor seal, the output of transmitter 35 is applied through line 51 to the measurement signal input 52 of a liquid level controller 53. Controller 53 is also provided with a setpoint input 54, an output 55 and an anti-reset-windup feedback input 56. Setpoint 54 of controller 53 can be adjusted to correspond to the abnormal low value of liquid level on tray 16 which is the minimum value necessary to prevent loss of vapor seal and above which the liquid level is to be maintained. Line 57 connects the output 29 of flow controler 25 to the first input 58 of selector relay 59 while line 61 connects output 55 of controller 53 to the second input 62 of selector relay 59. Whether selector relay 59 is a low input or a high input relay will depend on whether controllers 25 and 53 are direct action controllers or reverse action controllers and whether valve 24 requires an increasing signal to close or a decreasing signal to close. For example, selector relay 59 can be a low input selector relay where the abnormal value represented by the setpoint 54 of controller 53 is less than the normal value represented by setpoint 39 of controller 38 and valve 24 is one which closes progressively with a decreasing input signal. Selector relay 59 can be a high input selector relay where the abnormal value is higher than the normal value and valve 24 is one which closes progressively with decreasing signal. The examples given above are based upon utilization of direct action controllers. The utilization of reverse action controllers requires a change in the direction of selection of the selector relay and the utilization of a corresponding action valve. Thus where relay 59 can be a high input selector relay when said abnormal value is less than said normal value and valve 24 is one which closes progressively with an increasing input signal. Where relay 59 is a low input selector relay and controller 53 is a reverse action controller, and the abnormal value represented by the setpoint of controller 53 is higher than the normal value valve means 24 is one which closes progressively with increasing input signal. The output 63 of relay 59 is connected by line 64 to valve 24 to actuate valve 24 responsive to the signal passed by relay 59. Output 63 can be connected by lines 65 and 66 to the antireset-windup feedback inputs 28 and 56 of controllers 25 and 53, respectively. This latter connection is advantageous in preventing reset windup of the controller which does not have control of valve 24.

Referring now to FIGURE 2 there is shown a control system in accordance with the invention which can maintain the liquid level on tray 16 between a minimum abnormal level and a maximum abnormal level as well as provide for a substantially constant flow rate of the first stream of fluid through conduit means 23. Those elements which are common with FIGURE 1 are designated by the same numerals as in FIGURE 1. An additional liquid level controller 71 is utilized in this embodiment. Controller 71 has a setpoint input 72, a measurement signal input 73, an antireset-windup feedback input 74 and an output 75. Setpoint 72 of controller 71 is adjusted to correspond to the value of liquid level on tray 16 which is to be considered as the maximum abnormal value. Thus the maximum abnormal value can be selected so as to prevent the possibility of flooding tray 16 and the trays below tray 16. The setpoint 54 of controller 53 is adjusted to correspond to the value of liquid level on tray 16 which represents the minimum liquid level to be permitted under abnormal conditions. Setpoint 39 of controller 38 is adjusted to correspond to a value intermediate the high value represented by setpoint 72 and the low value represented by setpoint 54, and represents the value of the liquid level on tray 16 which is to be maintained under normal conditions. In view of the utilization of a high value setpoint controller and a low value setpoint controller, it is necessary to utilize a low value selector relay 81 and a high value selector relay 82 connected in series to provide for the passage of the proper control signal to valve 24 for the existing conditions on tray 16. As illustrated in FIGURE 2 relays 81 and 82 are connected in series between an input 83 and an output 84 by means of a line 85 which connects the output 86 of relay 81 to the first input 87 of relay 82. The first input 83 of relay 81 also serves as the input to the series connection while the output 84 of relay 82 serves as the output of the series connection. The output 29 of flow controller 25 is connected through line 91 to the input 83 of the series. The output 84 of the series is connected through line 64 to valve 24 and also through lines 65, 66, and 90 to the antireset-windup feedback inputs 28, 56, and 74 of controllers 25, 53, and 71, respectively. As will be explained hereinafter it does not matter whether the series connection is low to high as illustrated in FIGURE 2 or high to low.

Although controllers 53 and 71 can be either reverse action controllers or direct action controllers and valve 24 can be either one which opens progressively or increasing signal or one which closes progressively on increasing signal, it is necessary that compatibility be maintained throughout the control system. In the embodiment illustrated in FIGURE 2 valve 24 is one which closes progressively with decreasing signal (commonly called a normally closed valve or air-to-open valve). Compatibility requires that controllers 53 and 71 be direct response controllers and further that the output 75 of controller 71 be connected by line 92 to the second input 93 of high value selector relay 82 while the output 55 of controller 53 is connected by line 94 to the second input 95 of low value selector relay 81. As previously noted it does not matter whether the low value selector relay 81 or the high value selector relay 82 is connected first in the series. This is illustrated in FIGURE 2a with the output 84 of relay 82 being connected to the first input 83 of relay 81, first input 87 of relay 82 functioning as the input of the series and output 86 of relay 81 functioning as the output of the series. The output 29 of flow controller 25 is connected through line 91 to input of the series connection 83.

In an alternative embodiment illustrated in FIGURE 2b valve 24 can be one which opens progressively with a decreasing input signal (commonly called a normally open valve or an air-to-close valve), and controllers 53 and 71 can be reverse response controllers with the output 75 of controller 71 being connected to the second input 95 of low value selector relay 81 and the output 55 of controller 53 being connected to the second input 93 of high value selector relay 82. Again the order of the connection of the low value selector relay and high value selector relay in the series is not significant, as is illustrated in FIGURE 3.

The output 29 of controller 25 is connected to first input 87 of high value selector relay 82, which also serves as the input of the series connection. Line 85 connects the output 84 of relay 82 to first input 83 of low value selector relay 81. Line 64 connects the output 86 of the series to normally open valve 24. Line 94 connects output 55 of reverse response controller 53. Also a condition sensor and transmitter 35a is illustrated instead of liquid level sensor and transmitter 35 as it is within the contemplation of the invention for the control system to be regulated responsive to any given characteristic of the source of the first and second fluid streams which is affected by the total flow rates of the first and second fluid streams. Thus condition sensor and transmitter 35a can be any suitable means operatively associated with the source of fluid for determining a characteristic of the fluid contained therein and for establishing an output signal representative thereof.

The following example is presented in further illustration of the invention and should not be construed to unduly limit the invention.

First and second fluid streams were withdrawn from a sidedraw tray on which it was desired to maintain the liquid level substantially constant at an intermediate value of 9 inches above tray floor 21 and while maintaining the flow rate of the first stream of fluid substantially constant at 8,000 barrels per stream day, but to maintain the liquid level on the sidedraw tray between a maximum abnormal value of 12 inches and a minimum abnormal value of 6 inches.

For a control system in accordance with FIGURE 2 the magnitude of signals within the system under several operating situations are illustrated in Table I. Standard pneumatic control components are used therein with diaphragm control valves 24 and 42 being of the normally closed (air-to-open) type. Controllers 38, 53 and 71 are of the "direct-acting" type, defined as "an increase in measurement signal in line 36 above the valve represented by setpoint 54 produces an increase in the output signal in line 94." In this circumstance, controller 25 is of the reverse-acting type.

TABLE I

| Liquid Level on tray 16, inches | Air Pressure, p.s.i., in Conduits | | | | | | | Source of Signal to Valve 24 |
|---|---|---|---|---|---|---|---|---|
|  | 36 | 92 | 94 | 43 | 91 | 85 | 64 |  |
| 9 | 9 | 5 | 13 | 9 | 9 | 9 | 9 | 91 |
| 13 | 13 | 14 | 15 | 15 | 9 | 9 | 14 | 92 |
| 5 | 5 | 3 | 4 | 3 | 9 | 4 | 4 | 94 |

With the modification of FIGURE 2a on the system of FIGURE 2 and under the same circumstances, the magnitudes of the signals within the system are set forth in Table II.

TABLE II

| Liquid Level on tray 16, inches | Air Pressure, p.s.i., in Conduits | | | | | | | Source of Signal to Valve 24 |
|---|---|---|---|---|---|---|---|---|
|  | 36 | 92 | 94 | 43 | 91 | 85 | 64 |  |
| 9 | 9 | 5 | 13 | 9 | 9 | 9 | 9 | 91 |
| 13 | 13 | 14 | 15 | 15 | 9 | 14 | 14 | 92 |
| 5 | 5 | 3 | 4 | 3 | 9 | 9 | 4 | 94 |

For the same process utilizing a control system in accordance with FIGURE 2b, wherein valve 24 is of the normally open type, valve 42 is of the normally closed type, controllers 53 and 71 are reverse response controllers, and controllers 38 and 25 are direct response controllers, exemplary magnitudes of the signals within the system are set forth in Table III.

TABLE III

| Liquid Level on tray 16, inches | Air Pressure, p.s.i., in Conduits | | | | | | | Source of Signal to Valve 24 |
|---|---|---|---|---|---|---|---|---|
|  | 36 | 92 | 94 | 43 | 91 | 85 | 64 |  |
| 9 | 9 | 13 | 5 | 9 | 9 | 9 | 9 | 91 |
| 13 | 13 | 4 | 3 | 15 | 9 | 4 | 4 | 92 |
| 5 | 5 | 15 | 14 | 3 | 9 | 9 | 14 | 94 |

For the same process utilizing a control system in accordance with FIGURE 3, wherein valve 24 is of the normally open type, valve 42 is of the normally closed type, controllers 53 and 71 are reverse response controllers, and controllers 38 and 25 are direct response controllers, exemplary magnitudes of the signals within the system are set forth in Table IV.

TABLE IV

| Liquid Level on tray 16, inches | Air Pressure, p.s.i., in Conduits | | | | | | | Source of Signal to Valve 24 |
|---|---|---|---|---|---|---|---|---|
|  | 36 | 92 | 94 | 43 | 91 | 85 | 64 |  |
| 9 | 9 | 13 | 5 | 9 | 9 | 9 | 9 | 91 |
| 13 | 13 | 4 | 3 | 15 | 9 | 9 | 4 | 92 |
| 5 | 5 | 15 | 14 | 3 | 9 | 14 | 14 | 94 |

Reasonable variation and modification are possible within the scope of the foregoing disclosure, the drawings and the appended claims to the invention.

I claim:

1. Apparatus comprising a source of a fluid, first conduit means communicating with said source of fluid for withdrawing a first stream of fluid therefrom; second conduit means communicating with said source of fluid for withdrawing a second stream of fluid therefrom; a first valve means operatively positioned in said first conduit means; a second valve means operatively positioned in said second conduit means; a flow controller having a flow measurement signal input, a setpoint signal input and an output; a flow sensing means operatively associated with said first conduit means for producing an output signal representative of the flow rate of said first stream of fluid through said first conduit means; means connecting said output signal of said flow sensing means to said flow measurement signal input of said flow controller; a selector relay having first and second inputs and an output; means connecting said output of said flow controller to said first input of said selector relay; means operatively associated with said source of fluid for determining a characteristic of the fluid contained therein and for establishing an output signal representative thereof; a first controller having a setpoint input, a measurement signal input and an output; a second controller having a setpoint input, a measurement signal input and an output; means for connecting said output signal of said means for determining to the measurement signal inputs of said first and second controllers; means connecting said output of said second controller to said second valve means to regulate the rate of flow of said second stream of fluid through said second conduit means responsive to the output of said second controller; means connecting said output of said first controller to said second input of said selector relay; and means connecting said output of said selector relay to said first valve means to regulate the rate of flow of said first stream of fluid through said first conduit means responsive to the output of said selector relay.

2. Apparatus in accordance with claim 1 wherein said means for determining characteristic of the fluid in said source is a liquid level sensor.

3. Apparatus in accordance with claim 1 wherein said means for determining a characteristic of the fluid in said source is a temperature sensor.

4. Apparatus in accordance with claim 1 wherein said means for determining a characteristic of the fluid in said source is a pressure sensor.

5. Apparatus comprising a source of a fluid, first conduit means communicating with said source of fluid for withdrawing a first stream of fluid therefrom; second conduit means communicating with said source of fluid for withdrawing a second stream of fluid therefrom; a first valve means operatively positioned in said first conduit means; a second valve means operatively positioned in said second conduit means; a flow controller having a flow measurement signal input, a setpoint signal input, an anti-reset-windup feedback input, and an output; a flow sensing means operatively associated with said first conduit means for producing an output signal representative of the flow rate of said first stream of fluid through said first conduit means; means connecting said output signal of said flow sensing means to said flow measurement signal input of said flow controller; a low input selector relay having first and second inputs and an output; means connecting said output of said flow controller to said first input of said low selector relay; means operatively associated with said source of fluid for determining a characteristic of the fluid contained therein and for establishing an output signal representative thereof; a first controller having an abnormal value setpoint input, a measurement signal input and an output whose output value decreases as the value of said characteristic approaches said abnormal value from the direction of a normal value; a second controller having a normal value setpoint input, a measurement signal input and an output; means for connecting said output signal of said means for determining to the said measurement signal inputs of said first and second controllers; means connecting said output of said second controlled to said second valve means to regulate the rate of flow of said second stream of fluid through said second conduit means responsive to the output of said second controller to maintain the value of said characteristic substantially at said normal value; means connecting said output of said first controller to said second input of said low input selector relay; means connecting said output of said low input selector relay to said first valve means to regulate the rate of flow of said first stream of fluid through said first conduit means responsive to the output of said low input selector relay, said first valve means being a valve which opens progressively with decreasing signal if said abnormal value is higher than said normal value and being a valve which closes progressively with the decreasing signal if said abnormal value is less than said normal value; and means connecting said output of said low input selector relay to said antireset-windup feedback input of said flow controller.

6. Apparatus comprising a source of a fluid, first conduit means communicating with said source of fluid for withdrawing a first stream of fluid therefrom; second conduit means communicating with said source of fluid for withdrawing a second stream of fluid therefrom; a first valve means operatively positioned in said first conduit means; a second valve means operatively positioned in said second conduit means; a flow controller having a flow measurement signal input, a setpoint signal input, an antireset-windup feedback input, and an output; a flow sensing means operatively associated with said first conduit means for producing an output signal representative of the flow rate of said first stream of fluid through said first conduit means; means connecting said output signal of said flow sensing means to said flow measurement signal input of said flow controller; a high input selector relay having first and second inputs and an output; means connecting said output of said flow controller to said first input of said high input selector relay; means operatively associated with said source of fluid for determining a characteristic of the fluid contained therein and for establishing an output signal representative thereof; a first controller having an abnormal value setpoint input, a measurement signal input and an output whose value increases as the value of said characteristic approaches said abnormal value from the direction of a normal value; a second controller having a normal value setpoint input, a measurement signal input and an output; means for connecting said output signal of said means for determining to the said measurement signal inputs of said first and second controllers; means connecting said output of said second controller to said second valve means to regulate the rate of flow of said second stream of fluid through said second conduit means responsive to the output of said second controller to maintain the value of said characteristic substantially at said normal value; means connecting said output of said controller to said second input of said high input selector relay; means connecting said output of said high input selector relay to said first valve means to regulate the rate of flow of said first stream of fluid through said first conduit means responsive to the output of said high input selector relay; said first valve means being a valve which opens progressively with increasing signal if said abnormal value is higher than said normal value and being a valve which closes progressively with increasing signal if said abnormal value is less than said normal value; and means connecting said output of said high input selector relay to said antireset-windup feedback input of said flow controller.

7. Apparatus comprising a source of a fluid, first conduit means communicating with said source of fluid for withdrawing a first stream of fluid therefrom; second conduit means communicating with said source of fluid for withdrawing a second stream of fluid therefrom; a first valve means operatively positioned in said first conduit means; a second valve means operatively positioned in said second conduit means; a flow controller having a flow measurement signal input, a setpoint signal input, and an output; a flow sensing means operatively associated with said first conduit means for producing an output signal representative of the flow rate of said first stream of fluid through said first conduit means; means connecting said output signal of said flow sensing means to said flow measurement signal input of said flow controller; a low input selector relay and a high input selector relay connected in series between an input and an output; means connecting said output of said flow controller to said input of said series, each of said relays having first and second inputs with said first input being utilized in the series connection; means operatively associated with said source of fluid for determining a characteristic of the fluid contained therein and for establishing an output signal representative thereof; a first controller having a high value setpoint input, a measurement signal input and an output; a second controller having a low value setpoint input, a measurement signal input and an output; a third controller having a setpoint input intermediate said high value and said low value, a measurement signal input and an output; means for connecting said output signal of said means for determining to the said measurement signal inputs of said first, second and third controllers; means connecting said output of said third controller to said second valve means to regulate the rate of flow of said second stream of fluid through said second conduit means responsive to the output of said third controller; means connecting said output of said first controller to the second input of one of said low input selector relay and said high input selector relay, said first controller being a reverse response controller and the output of said first controller being connected to the second input of said low input selector relay when said first valve means opens progressively with decreasing signal and said first controller being a direct response controller and the output of said first controller being connected to the second input of said high input selector relay when said first valve means closes progressively with decreasing signal; means connecting the output of said second controller to the second input of the other of said low input selector relay and said high input selector relay, said second controller being a reverse response controller and the output of said second controller being connected to the second input of said high input selector relay when said first valve means opens progressively with decreasing signal and said second controller being a direct response controller and the output of said second controller being connected to the second input of said low input selector relay when said first valve means closes progressively with decreasing signal; and means connecting said output of said series to said first valve means to regulate the rate of flow of said first stream of fluid through said first conduit means.

8. Apparatus in accordance with claim 7 wherein said means for determining a characteristic of the fluid in said source is a liquid level sensor.

9. Apparatus in accordance with claim 7 wherein said means for determining a characteristic of the fluid in said source is a temperature sensor.

10. Apparatus in accordance with claim 7 wherein said means for determining a characteristic of the fluid in said source is a pressure sensor.

11. Apparatus comprising a source of a fluid, first conduit means communicating with said source of fluid for withdrawing a first stream of fluid therefrom; second conduit means communicating with said source of fluid for withdrawing a second stream of fluid therefrom; a first valve means operatively positioned in said first conduit means and which closes progressively with decreasing signal; a second valve means operatively positioned in said second conduit means; a flow controller having a flow measurement signal input, a setpoint signal input, and an output; a flow sensing means operatively associated with said first conduit means for producing an output signal representative of the flow rate of said first stream of fluid through said first conduit means; means connecting said output signal of said flow sensing means to said flow measurement signal input of said flow controller; a first selector relay having first and second inputs and an output; a second selector relay having first and second inputs and an output; one of said first and second selector relays being a low input selector relay and the other being a high input selector relay; means for connecting said output of said first selector relay to said first input of said second selector relay; means for connecting said output of said flow controller to said first input of said first selector relay; means operatively associated with said source of fluid for determining a characteristic of the fluid contained therein and for establishing an output signal representative thereof; a first direct response controller having a high value setpoint input, a measurement signal input and an output; a second direct response controller having a low value setpoint input, a measurement signal input and an output; a third controller having a setpoint input intermediate said high value and said low value, a measurement signal input and an output; means for connecting said output signal of said means for determining to said signal input of said first, second and third controllers; means connecting said output of said third controller to said second valve means to regulate the rate of flow of said second stream of fluid through said second conduit means responsive to the output of said third controller; means connecting said output of said first controller to the second input of said high input selector relay; means connecting the output of said second controller to the second input of said low input selector relay; and means connecting said output of said second selector relay to said first valve means to regulate the rate of flow of said first stream of fluid through said first conduit means.

12. Apparatus comprising a source of a fluid, first conduit means communicating with said source of fluid for withdrawing a first stream of fluid therefrom; second conduit means communicating with said source of fluid for withdrawing a second stream of fluid therefrom; a first valve means operatively positioned in said first conduit means and which opens progressively with decreasing signal; a second valve means operatively positioned in said second conduit means; a flow controller having a flow measurement signal input, a setpoint signal input, and an output; a flow sensing means operatively associated with said first conduit means for producing an output signal representative of the flow rate of said first stream of fluid through said first conduit means; means connecting said output signal of said flow sensing means to said flow measurement signal input of said flow controller; a first selector relay having first and second inputs and an output; a second selector relay having first and second inputs and an output; one of said first and second selector relays being a low input selector relay and the other being a high input selector relay; means for connecting said output of said first selector relay to said first input of said second selector relay; means for connecting said output of said flow controller to said first input of said first selector relay; means operatively associated with said source of fluid for determining a characteristic of the fluid contained therein and for establishing an output signal representative thereof; a first reverse response controller having a high value setpoint input, a measurement signal input and an output; a second reverse response controller having a low value setpoint input, a measurement signal input and an output; a third controller having a setpoint input intermediate said high value and said low value, a measurement signal input and an output; means for connecting said output signal of said means for determining to said signal input of said first, second and third controllers; means connecting said output of said third controller to said second valve means to regulate the rate of flow of said second stream of fluid through said second conduit means responsive to the output of said third controller; means connecting said output of said first controller to the second input of said low input selector relay; means connecting the output of said second controller to the second input of said high input selector relay; and means connecting said output of said second selector relay to said first valve means to regulate the rate of flow of said first stream of fluid through said first conduit means.

References Cited

UNITED STATES PATENTS 2,467,951  4/1949  Whitley _____ 137—389 X
3,219,051  11/1965  Francis _____ 137—395 X WILLIAM F. O'DEA, *Primary Examiner.*

D. R. MATTHEWS, *Assistant Examiner.*